US012462750B2

(12) United States Patent
Zhang

(10) Patent No.: US 12,462,750 B2
(45) Date of Patent: Nov. 4, 2025

(54) PIXEL CIRCUIT AND DISPLAY PANEL

(71) Applicant: Wuhan China Star Optoelectronics Semiconductor Display Technology Co., Ltd., Hubei (CN)

(72) Inventor: Huanxi Zhang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 18/561,001

(22) PCT Filed: Jun. 30, 2023

(86) PCT No.: PCT/CN2023/104624
§ 371 (c)(1),
(2) Date: Nov. 15, 2023

(87) PCT Pub. No.: WO2024/103784
PCT Pub. Date: May 23, 2024

(65) Prior Publication Data

US 2025/0095573 A1 Mar. 20, 2025

(30) Foreign Application Priority Data

Nov. 14, 2022 (CN) ........................ 202211417159.4

(51) Int. Cl.
*G09G 3/3233* (2016.01)
*G09G 3/32* (2016.01)

(52) U.S. Cl.
CPC ............ *G09G 3/3233* (2013.01); *G09G 3/32* (2013.01); *G09G 2300/0426* (2013.01);
(Continued)

(58) Field of Classification Search
CPC .................. G09G 3/3233; G09G 3/32; G09G 2300/0426; G09G 2300/0842;
(Continued)

(56) References Cited

U.S. PATENT DOCUMENTS

| | | | |
|---|---|---|---|
| 8,319,713 | B2 | 11/2012 | Choi |
| 10,535,302 | B2 | 1/2020 | Yuan et al. |

(Continued)

FOREIGN PATENT DOCUMENTS

| | | |
|---|---|---|
| CN | 107799062 | 3/2018 |
| CN | 107993612 | 5/2018 |

(Continued)

OTHER PUBLICATIONS

Notification of Office Action and Search Report Dated Sep. 13, 2024 From The State Intellectual Property Office of the People's Republic of China Re. Application No. 202211417159.4 and Its Translation Into English. (20 Pages).

(Continued)

*Primary Examiner* — Temesghen Ghebretinsae
*Assistant Examiner* — Sosina Abebe

(57) ABSTRACT

The present disclosure proposes a pixel circuit and a display panel. The pixel circuit includes a driving transistor, a light-emitting device, a feedback transistor, and a feedback capacitor. By coupling the feedback transistor and feedback capacitor between the gate of the driving transistor and the anode of the light-emitting device, the pixel circuit and display panel can make the voltage level of the gate of the driving transistor change correlatively with the voltage level of the anode of the light-emitting device. This can reduce the brightness change of the light-emitting device, and improves the brightness of the light-emitting device.

18 Claims, 12 Drawing Sheets

(52) U.S. Cl.
CPC . *G09G 2300/0842* (2013.01); *G09G 2310/08* (2013.01); *G09G 2320/0233* (2013.01); *G09G 2320/0242* (2013.01)

(58) Field of Classification Search
CPC ....... G09G 2310/08; G09G 2320/0233; G09G 2320/0242
See application file for complete search history.

(56) References Cited

U.S. PATENT DOCUMENTS

| | | | | |
|---|---|---|---|---|
| 10,692,440 | B2 | 6/2020 | Kuk et al. | |
| 11,749,199 | B1 | 9/2023 | Pu et al. | |
| 2009/0243976 | A1* | 10/2009 | Choi | G09G 3/3233 345/76 |
| 2021/0210518 | A1* | 7/2021 | Tanaka | G09G 3/3233 |

FOREIGN PATENT DOCUMENTS

| | | |
|---|---|---|
| CN | 109036289 | 12/2018 |
| CN | 110634446 | 12/2019 |
| CN | 110782838 | 2/2020 |
| CN | 111986612 | 11/2020 |
| CN | 114898694 | 8/2022 |
| CN | 114974097 | 8/2022 |
| CN | 115662356 | 1/2023 |
| KR | 10-2009-0102449 | 9/2009 |
| KR | 10-2021-0088045 | 7/2021 |
| WO | WO 2020/233024 | 11/2020 |

OTHER PUBLICATIONS

Request for the Submission of an Opinion Dated Sep. 30, 2024 From the Korean Intellectual Property Office Re. Application No. 10-2023-7041312 and Its Translation Into English. (13 Pages).

International Search Report and the Written Opinion Dated Sep. 17, 2023 From the International Searching Authority Re. Application No. PCT/CN2023/104624 and Its Translation Into English. (21 Pages).

* cited by examiner

| | Before RA | HTO | Before RA | HTO |
|---|---|---|---|---|
| |  |  |  |  |
| CIE | (0.303,0.326) | (0.334,0.431) | (0.289,0.291) | (0.321,0.562) |
| Lum. | 0.025 | 0.039 | 0.021 | 0.092 |

PIXEL CIRCUIT AND DISPLAY PANEL

RELATED APPLICATIONS

This application is a National Phase of PCT Patent Application No. PCT/CN2023/104624 having International filing date of Jun. 30, 2023, which claims the benefit of priority of China Patent Application No. 202211417159.4 filed on Nov. 14, 2022. The contents of the above applications are all incorporated by reference as if fully set forth herein in their entirety.

FIELD OF THE DISCLOSURE

The present disclosure relates to a display technology, and more particularly, to a pixel circuit and a display panel.

BACKGROUND

Active Matrix Organic Light Emitting Diode (AMOLED) display technology is more and more widely used, especially in mobile phones, wearables devices, laptops and tablets. With the development of products, higher Pixels Per Inch (PPI) and high/low frequency display switching and other technical application needs, the display quality is unstable when the display is switching the display frequency. For example, a color cast for low grey levels might occur when the display is switching its display frequency.

With the increase of the working time of the pixel circuit or the display panel or the working time in high temperature and high humidity environment, it usually leads to the unstable brightness of the light-emitting device in the pixel circuit and affects the display quality.

SUMMARY

One objective of an embodiment of the present disclosure is to provide a pixel circuit and a display panel, to alleviate the issue of unstable brightness of the light-emitting devices.

According to a first aspect of the present disclosure, a pixel circuit is disclosed. The pixel circuit comprises: a driving transistor, wherein one of a source and a drain of the driving transistor is electrically connected to a first power line; a light-emitting device, having an anode electrically connected to the other of the source and the drain of the driving transistor, and a cathode electrically connected to a second power line; a feedback transistor, having a gate electrically connected to a first control line; and a feedback capacitor. The feedback capacitor and the feedback transistor are connected in series between the gate of the driving transistor and the anode of the light-emitting device.

In some embodiments of the present disclosure, one terminal of the feedback capacitor is electrically connected to a first initialization line, and the first initialization line receives a first initialization signal; another terminal of the feedback capacitor is electrically connected to a second initialization line, and the second initialization line receives a second initialization signal; the feedback transistor is connected in series between the feedback capacitor and the first initialization line or the second initialization line; and a voltage level of the first initialization signal is different from a voltage level of the second initialization signal.

In some embodiments of the present disclosure, the pixel circuit further comprises a first initialization transistor and a second initialization transistor. The first initialization is connected in series between the one terminal of the feedback capacitor and the first initialization line. A gate of the first initialization transistor is electrically connected to a second control line. The second initialization transistor is connected in series between the another terminal of the feedback capacitor and the second initialization line. A gate of the second initialization transistor is electrically connected to the second control line.

In some embodiments of the present disclosure, the pixel circuit further comprises a first light-emitting control transistor, a second light-emitting control transistor, a writing transistor, and a compensation transistor. One of a source and a drain of the first light-emitting control transistor is electrically connected to the other of the source and the drain of the driving transistor, the other of the source and the drain of the first light-emitting control transistor is electrically connected to the anode of the light-emitting device, and a gate of the first light-emitting control transistor is electrically connected to a light-emitting control line. One of a source and a drain of the second light-emitting control transistor is electrically connected to a first power line, a second electrode of the second light-emitting control transistor is electrically connected to one of the source and the drain of the driving transistor, and a gate of the second light-emitting control transistor is electrically connected to the light-emitting control line. One of a source and a drain of the writing transistor is electrically connected to the data line, the other of the source and the drain of the writing transistor is electrically connected to the first electrode of the driving transistor, and a gate of the writing transistor is electrically connected to a third control line. One of a source and a drain of the compensation transistor is electrically connected to the other of the source and the drain of the driving transistor, the other of the source and the drain of the compensation transistor is electrically connected to the gate of the driving transistor, and a gate of the compensation transistor is electrically connected to a fourth control line.

In some embodiments of the present disclosure, in an initialization stage of the pixel circuit, the first initialization transistor and the second initialization transistor are turned on, and the feedback transistor is turned on in at least part of the initialization stage to reset a voltage level of the gate of the driving transistor and a voltage level of the one terminal of the feedback capacitor through the first initialization signal and to reset a voltage level of the anode of the light-emitting device and a voltage level of the another terminal of the feedback transistor through the second initialization signal.

In some embodiments of the present disclosure, in a data writing stage of the pixel circuit, the data signal passes through the feedback transistor; the feedback capacitor raises a voltage level of the anode of the light-emitting device; and the voltage level of the anode of the light-emitting device is lower than an activation voltage of the light-emitting device.

In some embodiments of the present disclosure, in a light-emitting stage of the pixel circuit, a voltage level of a gate of the driving transistor changes inversely to a voltage level of the anode of the light-emitting device through the series-connected feedback transistor and the feedback capacitor.

In some embodiments of the present disclosure, in a black insertion stage of the pixel circuit, the series-connected feedback transistor and the feedback capacitor raise a voltage level of a gate of the driving transistor and reduce a voltage level of the anode of the light-emitting device.

In some embodiments of the present disclosure, the first control line is configured to transmit a first control signal, and the light-emitting control line is configured to transmit a light-emitting control signal; a frequency of the first control signal is greater than a frequency of the light-emitting control signal.

According to a second aspect of the present disclosure, the present disclosure, a display panel is disclosed. The display panel comprises a plurality of the aforementioned pixel circuits. Each of the pixel circuits further comprises a storage capacitor. One terminal of the storage capacitor is electrically connected to a gate of the driving transistor. Another terminal of the storage capacitor is electrically connected to the first power line.

Advantageous Effect

According to an embodiment of the present disclosure, by coupling the feedback transistor and feedback capacitor between the gate of the driving transistor and the anode of the light-emitting device, the pixel circuit and display panel can make the voltage level of the gate of the driving transistor change correlatively with the voltage level of the anode of the light-emitting device. This can not only control the light-emitting current flowing through the light-emitting device more stably through the correlatively-changed gate voltage of the driving transistor, but also reduce the brightness change of the light-emitting device. Furthermore, it can also allow the voltage level of the anode of the light-emitting device to reach the activation voltage earlier, thereby increasing the effective light-emitting time or improving the brightness of the light-emitting device.

Because the currents flowing through the light-emitting devices in different pixel circuits are more unified, the brightness of different light-emitting devices becomes more uniform. This can improve the color shift of the display panel, such as the greenish display.

DETAILED DESCRIPTION OF PREFERRED EMBODIMENTS

The following will be combined with the accompanying drawings in the embodiment of the present disclosure, the technical solution in the embodiment of the present disclosure will be described. The embodiments described are intended only to explain and illustrate the ideas of the present disclosure and should not be regarded as a limitation of the scope of protection of the present disclosure.

Figure 1:
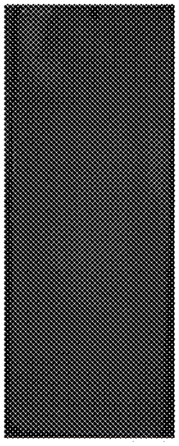
Fig. 1 (Related art)
FIG. 1 is a diagram showing a comparison of the low-grayscale screens before and after reliability tests according to the related art.
Figure 1:
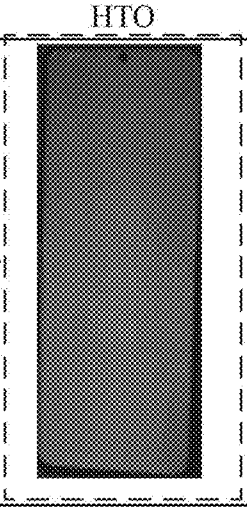
Fig. 1 (Related art)
Figure 1:
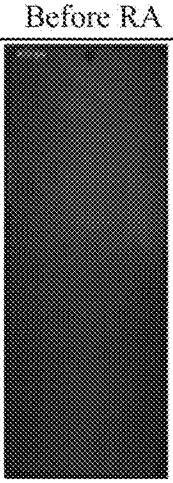
Fig. 1 (Related art)
Figure 1:
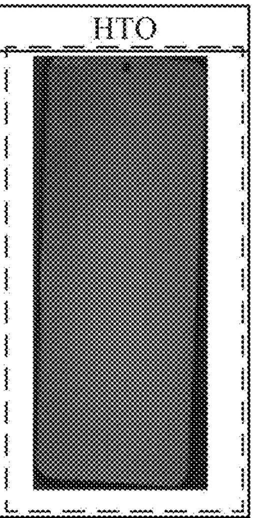
Fig. 1 (Related art)

The display screen may have greening or color cast issues when low gray values are displayed or in the frequency switching. Because the color cast is affected by a variety of factors, after a large number of analysis and experiments, it is found that the cause of this defect is caused by device aging. Please refer to FIG. 1. FIG. 1 is a diagram showing a comparison of the low-grayscale screens before and after reliability tests according to the related art. The first picture (leftmost picture) is a low-grayscale picture before the reliability (RA) tests, which is based on the color data (0.303, 0.326) determined by the International Commission on Illumination (CIE) 1976, and the corresponding brightness (Luminance, Lum.) is 0.025 nits. The second leftmost picture is a low-grayscale image after RA tests, which is based on the color data (0.334, 0.431) determined by the CIE, corresponding to a brightness of 0.039 nits.

Figure 2:
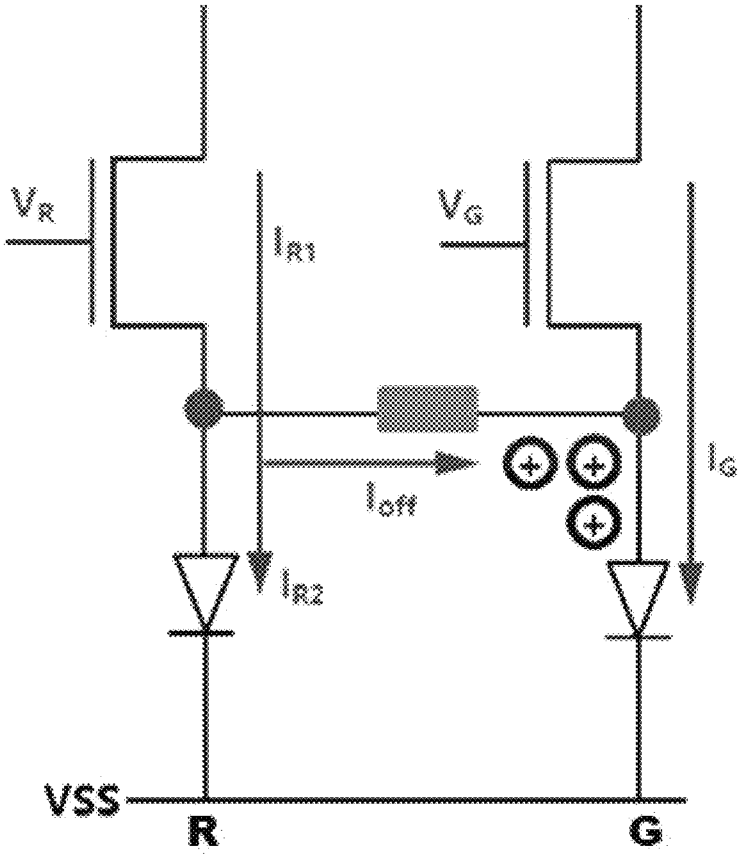
Fig. 2 (Related art)
FIG. 2 is a diagram showing a leakage current in different pixel circuits according to the related art.

The third leftmost picture of FIG. 2 is a low-grayscale picture before RA tests, which is based on the color data (0.289, 0.291) determined by the CIE, corresponding to a brightness of 0.021 nits. The fourth leftmost picture (the rightmost picture) is a low-grayscale picture after RA tests, based on the color data (0.321, 0.562) determined by the CIE, corresponding to a brightness of 0.092 nits.

The first picture and the second picture use the same video data, and the third picture and the fourth picture use the same video data. However, after the RA tests, the displayed color of the second picture is greenish compared to the first picture. Similarly, compared to the third picture, the displayed color of the fourth picture is greenish.

The above RA tests can be at least one of the long-term normal operation, short period of work under high temperature and high humidity, or high temperature operation (HTO).

Further analysis and experiments on multiple factors of the influence of aging test find that this phenomenon is caused by leakage current between different pixel circuits. Under normal circumstances, this effect is very small and will not have a large impact. However, as the pixel density increases, the distance between pixels is also getting smaller. This effect becomes severer when the display frequency is switching at low gray levels. Please refer to FIG. 2. FIG. 2 is a diagram showing a leakage current in different pixel circuits according to the related art. The reason for the phenomenon shown in FIG. 1 is that the variance of the self-capacitance of light-emitting devices different colors of after the RA test is different, resulting in differences between the self-capacitance of light-emitting devices of different colors, which in turn leads to the leakage current ($I_{off}$) flowing from some light-emitting devices of other colors (for example, red (R) light-emitting devices) to the green (G) light-emitting devices. This increases the current flowing through the green (G) light-emitting device increases and thus increases the overall greenish color of the picture.

In addition, during the operations of the pixel circuit, it is necessary to charge the anode of the light-emitting device first, and the light-emitting device can only emit light after the voltage level of the anode of reaches its activation voltage.

Figure 3:
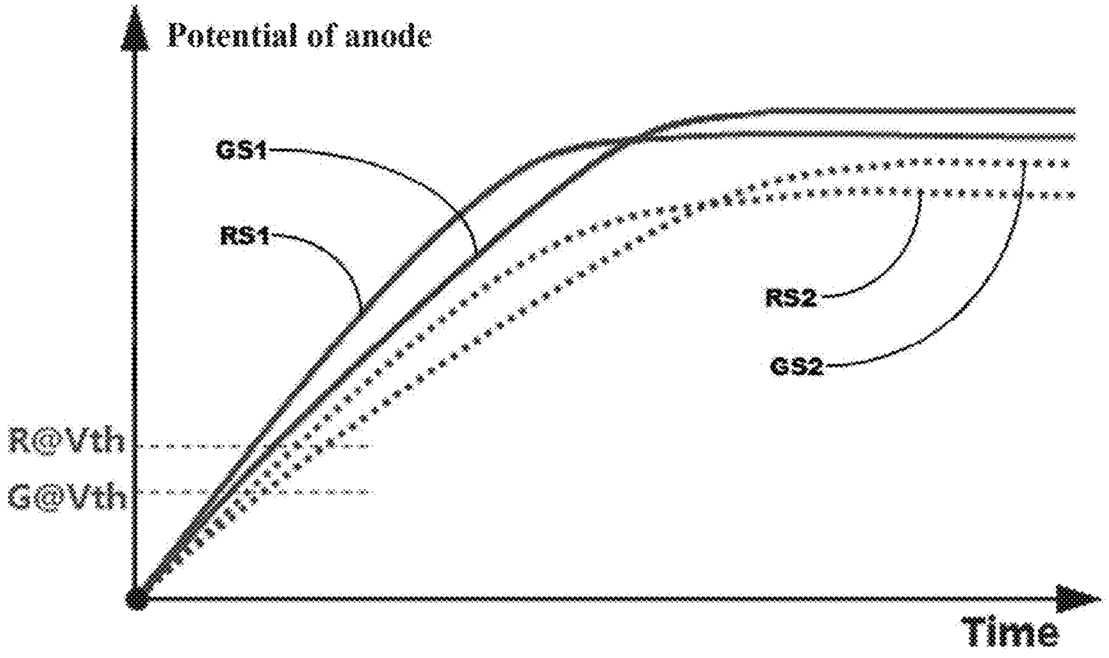
Fig. 3 (Related art)
FIG. 3 is a diagram showing a comparison of voltage level changes at anodes of light emitting devices of different colors according to the related art.

Please refer to FIG. 3. FIG. 3 is a diagram showing a comparison of voltage level changes at anodes of light emitting devices of different colors according to the related art. Here, the abscissa represents time, the ordinate represents the voltage level of the anode of the light-emitting device. R@Vth represents the activation voltage of the red light-emitting device, G@Vth represents the activation voltage of the green light-emitting device, RS1 represents the curve of the voltage level of the anode of the red light-emitting device before RA, RS2 represents the curve of the voltage level of the anode of the red light-emitting device after RA, GS1 represents the curve of the voltage level of the anode of the green light-emitting device before RA, and GS2 represents the curve of the voltage level of the anode of the green light-emitting device after RA.

From the comparison, it can be seen that after RA, the voltage level of the anode of the red light-emitting device takes a longer time to reach its own activation voltage, and the voltage level of the anode of the green light-emitting device also takes a longer time to reach its own activation voltage. This reduces the effective light-emitting time of each light-emitting device, and is also one of the reasons for the unstable brightness of each light-emitting device.

It is noted that the above light-emitting device could be an organic light-emitting diode, a mini light-emitting diode, a micro-light-emitting diode or a quantum dot light-emitting diode. Each of these light emitting diodes has its own capacitance. The capacitance may vary in a different amount based on the type of the light emitting diodes after a long period of time. The improved scheme and principle provided by the present disclosure can be applied to any of the aforementioned light-emitting diodes, especially in organic light-emitting materials.

In order to alleviate the above-mentioned brightness instability issue, a pixel circuit is disclosed according to an embodiment of the present disclosure. Please refer to FIGS. 4 to 12, the pixel circuit comprises a driving transistor T1, a light-emitting device D1, a feedback transistor T8 and a feedback capacitor C1. The first electrode of the driving transistor T1 is electrically connected to the first power line. The anode of the light-emitting device D1 is electrically connected to the second electrode of the driving transistor T1. The cathode of the light-emitting device D1 is electrically connected to the second power line. The gate of the feedback transistor T8 is electrically connected to the first control line. The feedback capacitor C1 and the feedback transistor T8 are connected in series between the gate of the driving transistor T1 and the anode of the light-emitting device D1. In the following embodiments, when the first electrode of the transistor is the source, the second electrode of the transistor is the drain. Or, when the first electrode of the transistor is the drain, the second electrode of the transistor is the source.

It is noted that, in this embodiment, the pixel circuit makes the gate voltage of the driving transistor T1 to change correlatively to the voltage level of the anode of light emitting diode D1 by coupling the feedback transistor T8 and the feedback capacitor C1 between the gate of the driving transistor T1 and the anode potential of the light-emitting device D1. This not only can control the current flowing through the light-emitting device D1 more stably through the correlatively-changed gate voltage of the driving transistor T1, but also reduce the brightness change of the light-emitting device D1. Furthermore, it can also control the voltage level of the anode of the light-emitting device D1 to reach the activation voltage earlier, thereby increasing the effective light-emitting time or improving the brightness of the light-emitting device D1.

Figure 4:
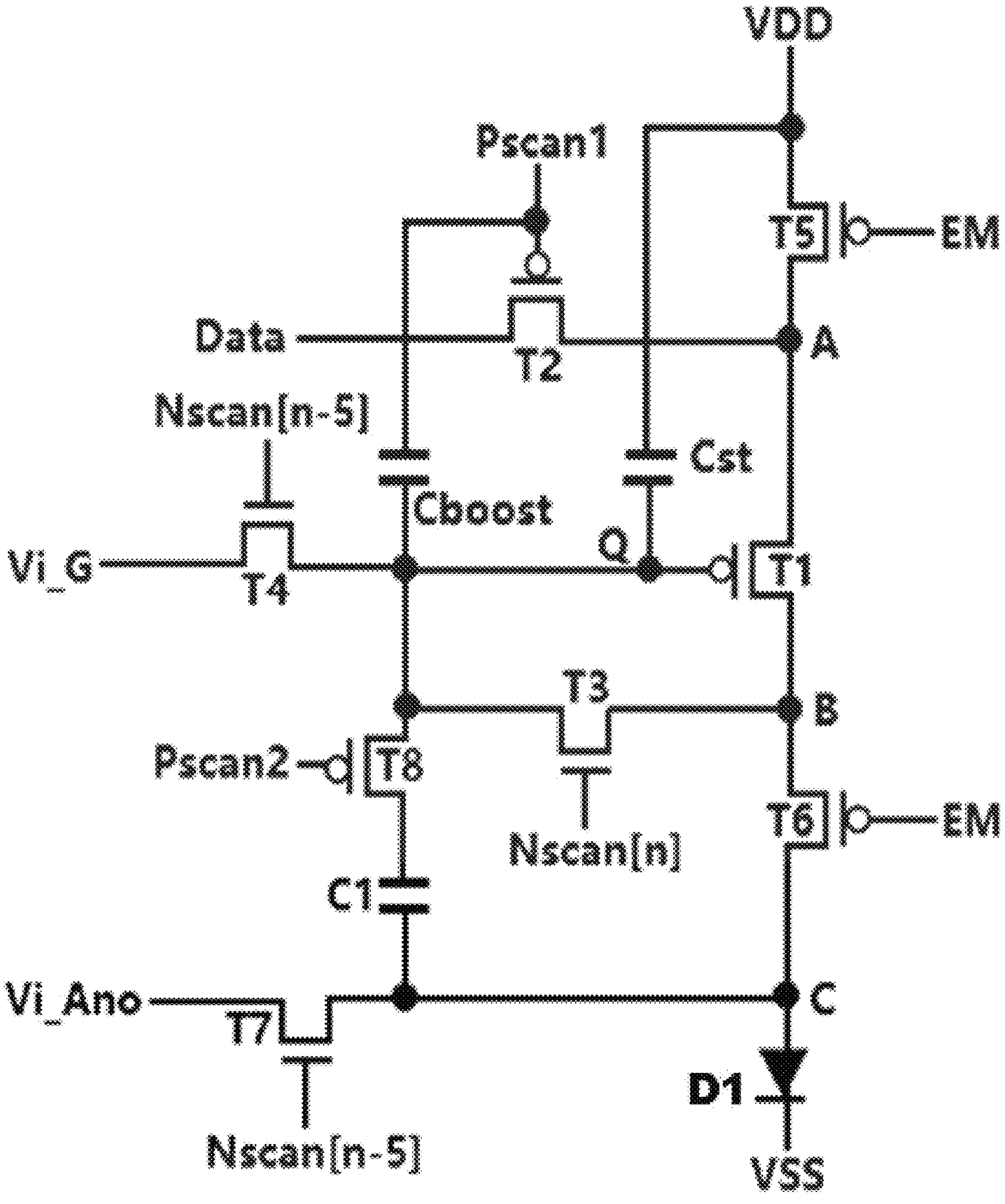
FIG. 4 is a diagram of a pixel circuit according to an embodiment of the present disclosure.
Figure 8:
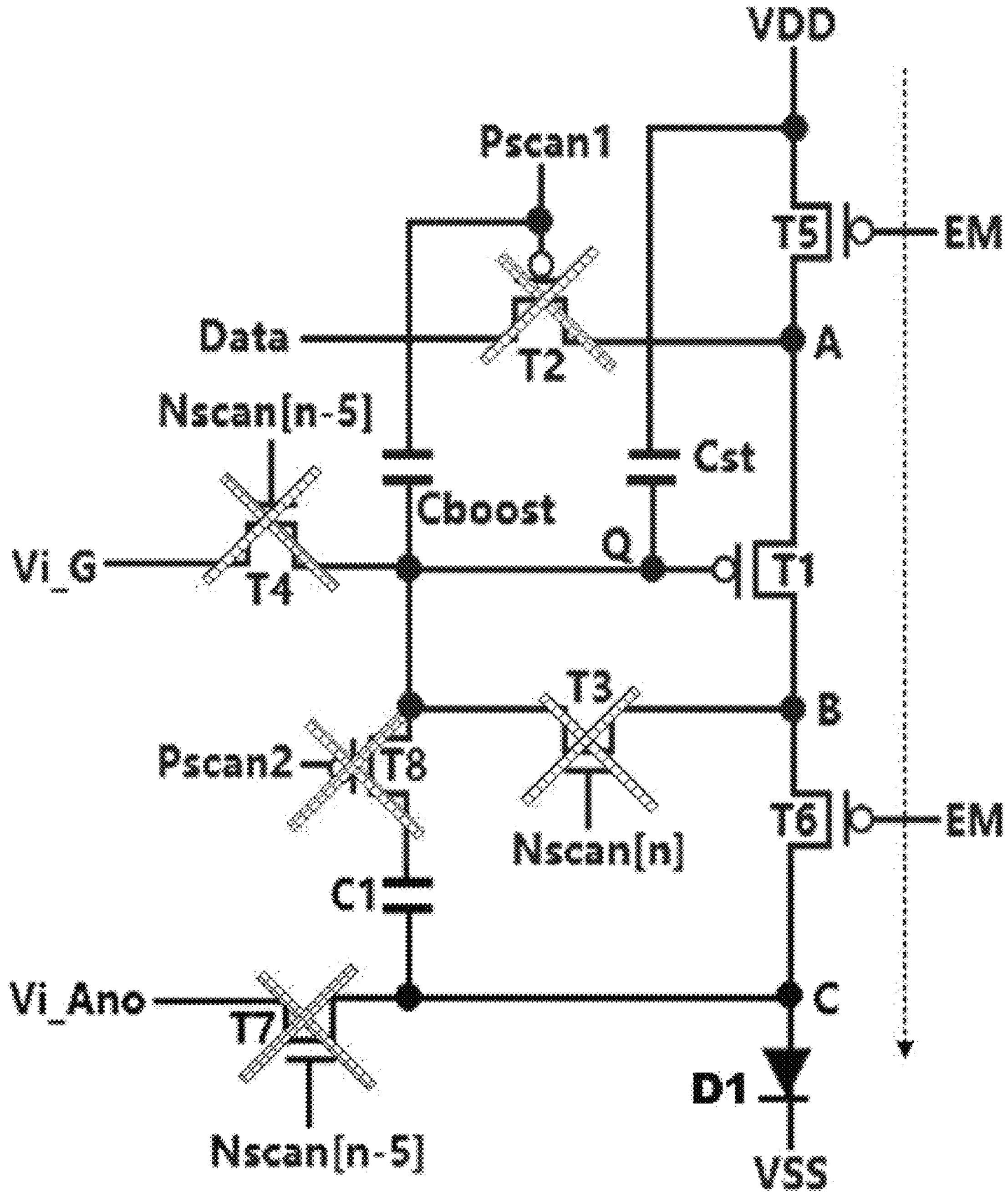
FIG. 8 is a diagram of the pixel circuit in a third stage of a frame according to an embodiment of the present disclosure.

In one embodiment, as shown in FIGS. 4 and 8, one terminal of the feedback capacitor C1 is electrically connected to the first initialization line. The first initialization line receives the first initialization signal Vi_G. The other terminal of the feedback capacitor C1 is electrically connected to the second initialization line. The second initialization line receives the second initialization signal Vi_Ano. The feedback transistor is connected in series between the feedback capacitor C1 and the first or second initialization line. The voltage level of the first initialization signal Vi_G is different from the voltage level of the second initialization signal Vi_Ano.

It is should be noted that the present embodiment can separately initialize the voltage levels of one terminal of the feedback capacitor C1 and the other terminal of the feedback capacitor C1 to the different voltage levels through the first initialization line and the second initialization line such that the voltage difference between the gate of the feedback capacitor C1 driving transistor T1 and the anode of the light-emitting device D1 could be accurately controlled.

In one embodiment, as shown in FIG. 4, the first electrode of the feedback transistor T8 is electrically connected to the gate of the driving transistor T1. One terminal of the feedback capacitor C1 is electrically connected to the second electrode of the feedback transistor T8, and the other terminal of the feedback capacitor C1 is electrically connected to the anode of the light-emitting device D1.

It is should be noted that through the turning-on period of the feedback transistor T8, the time period when the voltage level of the gate of the driving transistor T1 changes relatively to the voltage level of the anode of the light-emitting device D1 can be selected. In this way, the voltage level of the anode of the light-emitting device D1 can be pre-charged by the voltage level of the gate of the driving transistor T1 to reach the activation voltage earlier. It can also maintain the voltage level of the gate of the driving transistor T1 and/or the voltage level of the anode of the light-emitting device D1 through the correlative change between the gate voltage of the driving transistor T1 and the voltage level of the anode of the light-emitting device D1 to more stably control the current flowing through the light-emitting device D1 and reduce the brightness change of the light-emitting device D1.

Figure 12:
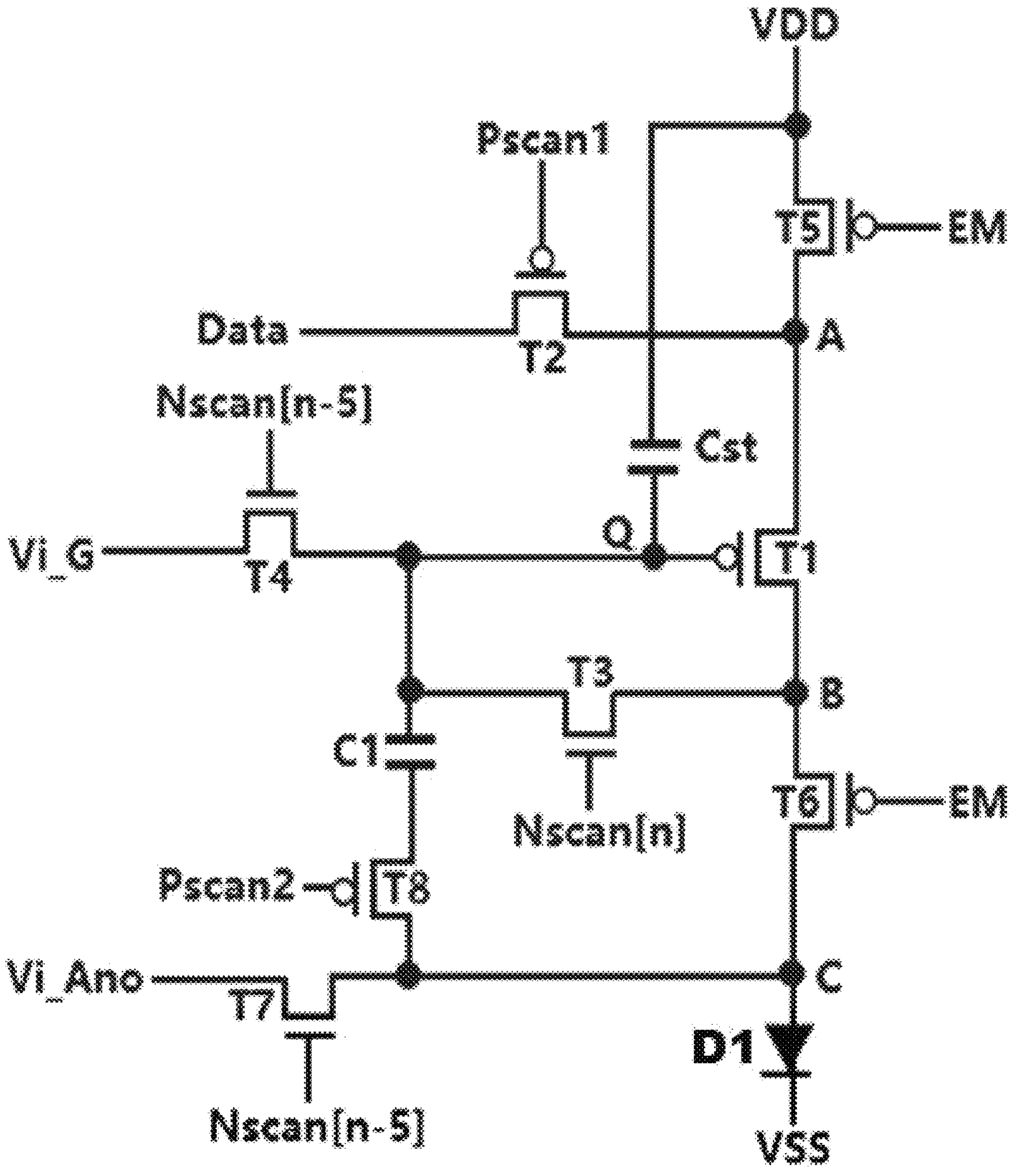
FIG. 12 is a diagram of a pixel circuit according to another embodiment of the present disclosure.

In one embodiment, as shown in FIG. 12, one terminal of the feedback capacitor C1 is electrically connected to the gate of the driving transistor T1. The first electrode of the feedback transistor T8 is electrically connected to the other terminal of the feedback capacitor C1, and the second electrode of the feedback transistor T8 is electrically connected to the anode of the light-emitting device D1.

It is should be noted that, in this embodiment, through the turning-on period of the feedback transistor T8, the time period when the voltage level of the gate of the driving transistor T1 changes relatively to the voltage level of the anode of the light-emitting device D1 can be selected. In this way, the voltage level of the anode of the light-emitting device D1 can be pre-charged by the voltage level of the gate of the driving transistor T1 to reach the activation voltage earlier. It can also maintain the voltage level of the gate of the driving transistor T1 and/or the voltage level of the anode of the light-emitting device D1 through the correlative change between the gate voltage of the driving transistor T1 and the voltage level of the anode of the light-emitting device D1 to more stably control the current flowing through the light-emitting device D1 and reduce the brightness change of the light-emitting device D1.

In one embodiment, the pixel circuit further comprises a first initialization transistor T4 and a second initialization transistor T7. The first initialization transistor T4 is electrically connected to the first initialization line. The second electrode of the first initialization transistor T4 is electrically connected to the gate of the driving transistor T1. The gate of the first initialization transistor T4 is electrically connected to the second control line. The first electrode of the second initialization transistor T7 is electrically connected to the second initialization line, the second electrode of the second-initialization transistor T7 is electrically connected to the anode of the light-emitting device D1, and the gate of the second-initialization transistor T7 is electrically connected to the second control line.

It is should be noted that the first initialization line can initialize the voltage levels of the gate of the driving transistor T1 and one terminal of the series-connected feedback transistor T8 and the feedback capacitor C1 through the first initialization transistor T4. The second initialization line can initialize the voltage levels of the anode of the light-emitting device D1 and the other terminal of the series-connected feedback transistor T8 and the feedback capacitor C1 through the second initialization transistor T7. This can not only improve the accuracy of the current flowing through the driving transistor T1 and/or the light-emitting device D1, but also adjust the voltage difference between one terminal and the other terminal of the series-connected feedback transistor T8 and the feedback capacitor C1. In this way, the voltage levels of the gate of the driving transistor T1 and the anode of the light-emitting device D1, which change correlatively, could be accurately controlled and the expected voltage levels of the gate of the driving transistor T1 and/or the anode potential of the light-emitting device D1 could be obtained.

Here, the gate of the first initialization transistor T4 and the gate of the second initialization transistor T7 could share the same second control line. This could reduce the number of traces required by the pixel circuit and thus raise the density of the pixel circuit or the aperture rate of the display panel.

In another embodiment, the pixel circuit further comprises a first light-emitting control transistor T6, a second light-emitting control transistor T5, a writing transistor T2 and a compensation transistor T3. The first electrode of the first light-emitting control transistor T6 is electrically connected to the second electrode of the driving transistor T1, the second electrode of the first light-emitting control transistor T6 is electrically connected to the anode of the light-emitting device D1, and the gate of the first light-emitting control transistor T6 is electrically connected to the light-emitting control line. The first electrode of the second light-emitting control transistor T5 is electrically connected to the first power line, the second electrode of the second light-emitting control transistor T5 is electrically connected to the first electrode of the driving transistor T1, and the gate of the second light-emitting control transistor T5 is electrically connected to the light-emitting control line. The first electrode of the writing transistor T2 is electrically connected to the data line, the second electrode of the writing transistor T2 is electrically connected to the first electrode driving transistor T1, and the gate of the writing transistor T2 is electrically connected to the third control line. The first electrode of the compensation transistor T3 is electrically connected to the second electrode of the driving transistor T1, the second electrode of the compensation transistor T3 is electrically connected to the gate of the driving transistor T1, and the gate of the compensation transistor T3 is electrically connected to the fourth control line.

It is should be noted that the gate of the second light-emitting control transistor T5 shares the same light-emitting control line with the gate of the first light-emitting control transistor T6. This can reduce the number of traces required by the pixel circuit and thus could raise the density of the pixel circuit or the aperture rate of the display panel.

Under the control of the third control line and the fourth control line, the data signal Data transmitted in the data line can pass through the writing transistor T2, the driving transistor T1 and the compensation transistor T3 to reach the gate of the driving transistor T1. At the same time, the data signal Data can also pre-charge the anode of the light-emitting device D1 through the feedback transistor T8 and the feedback capacitor C1 to raise the voltage level of the anode the light-emitting device D1 in advance. This can reduce the time for the anode of the light-emitting device D1 to reach its activation voltage in the light emitting stage, so that the light-emitting device D1 can emit light earlier in the light-emitting stage. This increases the effective light-emitting time of the light-emitting device D1.

In another embodiment, the pixel circuit further comprises a storage capacitor Cst. One terminal of the storage capacitor Cst is electrically connected to the gate of the driving transistor T1, and the other terminal of the storage capacitor Cst is electrically connected to the first power line.

In another embodiment, the pixel circuit also includes a bootstrap capacitor Cboost. One terminal of the bootstrap capacitor Cboost is electrically connected to the gate of the writing transistor T2, and the other terminal of the bootstrap capacitor Cboost is electrically connected to the gate of the driving transistor T1.

In another embodiment, at least one of the driving transistor T1, the first light-emitting control transistor T6, the second light-emitting control transistor T5, the first initialization transistor T4, the second initialization transistor T7, the writing transistor T2, the feedback transistor T8 and the compensation transistor T3 may be, but not limited to, an N-type thin-film transistor (TFT), or more specifically a metal oxide TFT, such as an indium gallium zinc oxide TFT. Alternatively, at least one of the driving transistor T1, the first light-emitting control transistor T6, the second light-emitting control transistor T5, the first initialization transistor T4, the second initialization transistor T7, the writing transistor T2, and the compensation transistor T3 may also be a P-type TFT, or more specifically a polycrystalline silicon TFT, such as a low-temperature polycrystalline silicon TFT.

Preferably, the driving transistor T1, the first light-emitting control transistor T6, the second light-emitting control transistor T5, the feedback transistor T8, and the writing transistor T2 are all P-type low-temperature polycrystalline silicon TFTs to maximize the dynamic performance of the pixel circuit. The first initialization transistor T4, the compensation transistor T3 and the second initialization transistor T7 are all N-type indium gallium zinc oxide TFTs to reduce the leakage current phenomenon of the gate of the driving transistor T1 and the anode of the light-emitting device D1.

Preferably, the feedback transistor T8 may also be an N-type indium gallium zinc oxide TFT to further reduce the leakage current phenomenon of the gate of the driving transistor T1.

It should be noted that the first power line is used to transmit the first power signal VDD, the second power line is used to transmit the second power signal VSS, and the voltage level of the first power signal VDD is higher than the voltage level of the second power signal VSS. The light-emitting control line is used to transmit the light-emitting control signal EM. The first control line is used to transmit a first control signal, which may be, but not limited to, the scan signal Pscan2, or any other scan signal with a positive pulse. The second control line is used to transmit a second control signal, which may be, but not limited to, the scan signal Nscan [n−5], or the scan signal Nscan [n−1], the scan signal Nscan [n−2], the scan signal Nscan [n−3], the scan signal Nscan [n−4], the scan signal Nscan[n−6] . . . etc. The third control line is used to transmit a third control signal. The third control signal may be, but not limited to, the scan signal Pscan1, or can be any other control signals. The fourth control line is used to transmit a fourth control signal. The fourth control signal may be, but not limited to, the scan signal Nscan[n], or any other applicable control signals. The first initialization line is used to transmit the first initialization signal Vi_G. The second initialization line is used to transmit the second initialization signal. The data line is used to transmit a data signal Data.

The operations of the pixel circuit in a frame may include the following stages a first stage S1, a second stage S2, a third stage S3, and a fourth stage S4.

Figure 5:
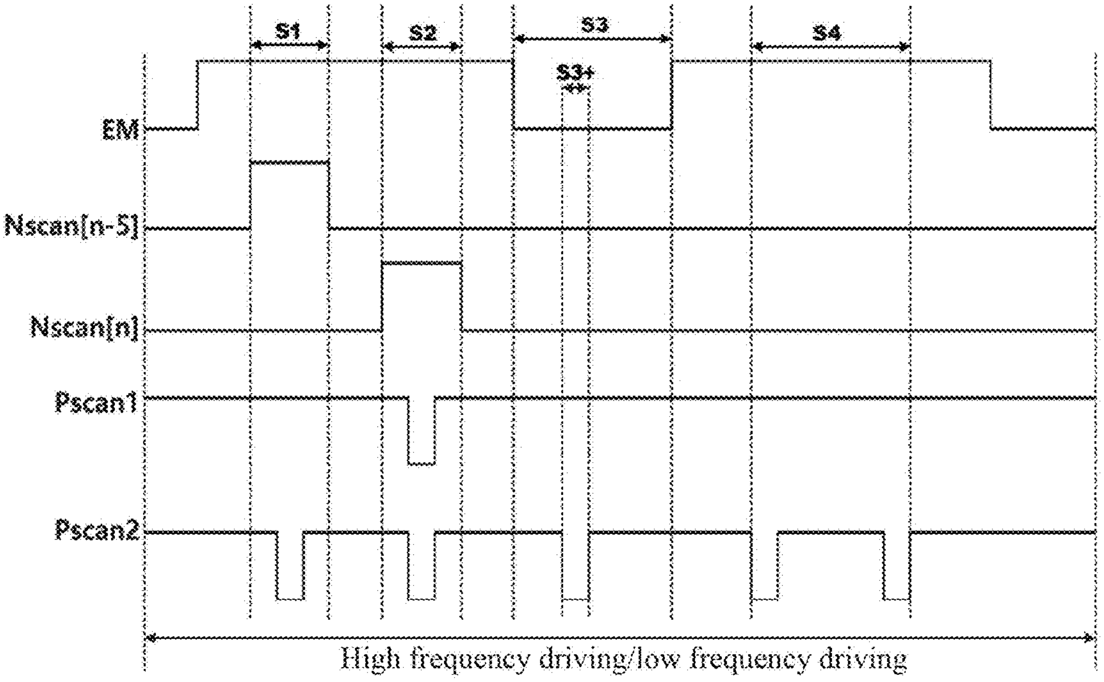
FIG. 5 is a timing diagram of the pixel circuit shown in FIG. 4.
Figure 6:
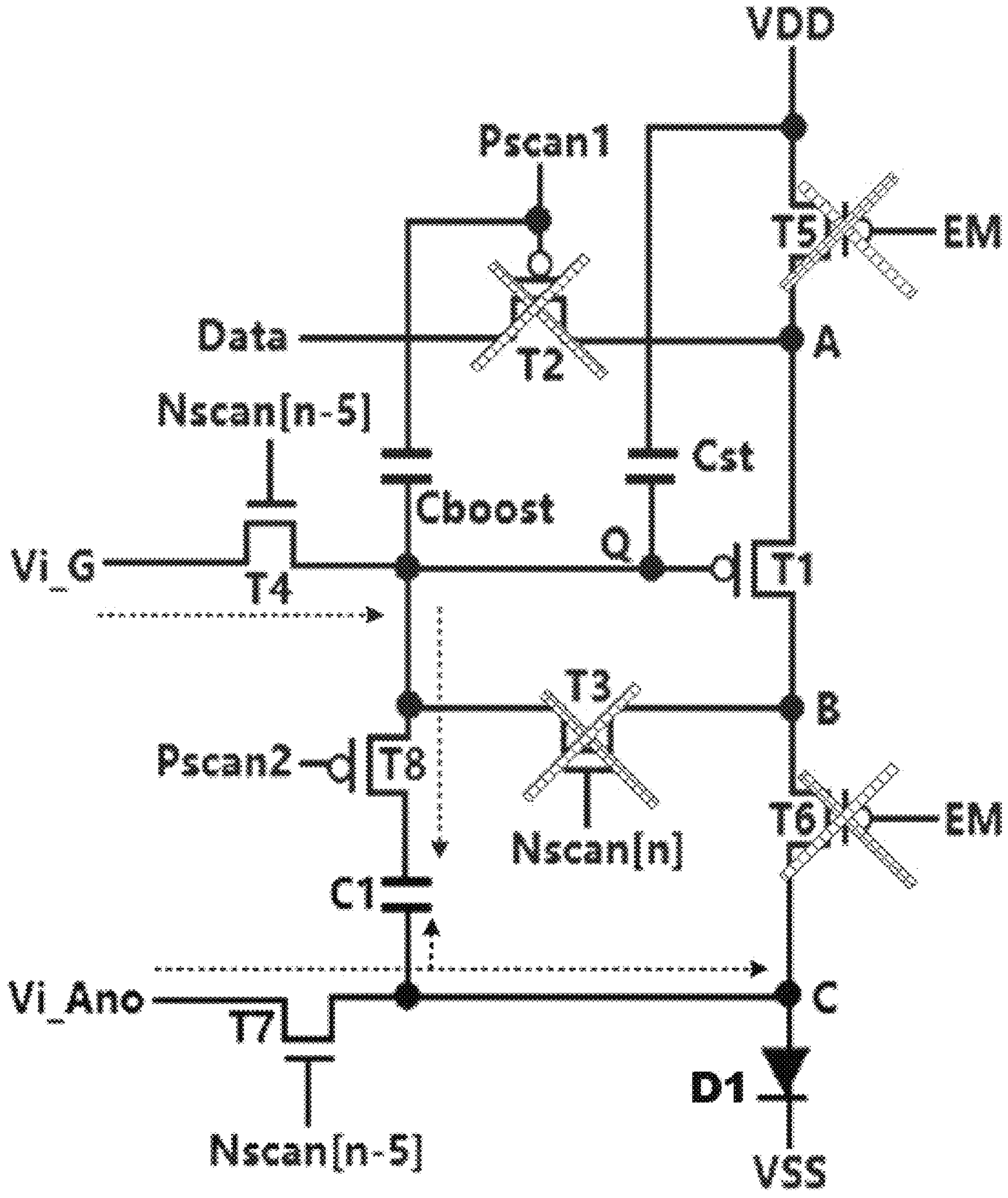
FIG. 6 is a diagram of the pixel circuit in a first stage of a frame according to an embodiment of the present disclosure.

The first stage S1 (initialization stage): As shown in FIGS. 5 and 6, the light-emitting control signal EM, the scan signal Nscan[n−5] and the scan signal Pscan1 are set high, the scan signal Nscan[n] and the scan signal Pscan2 are set low, the first initialization transistor T4, the second initialization transistor T7 and the feedback transistor T8 are in the turning-on state. Here, the feedback transistor T8 is turned on in at least part of the first stage. This can respectively initialize the voltage levels of one terminal and the other terminal of the series-connected feedback transistor T8 and the feedback capacitor C1, the voltage level of the first initialization signal Vi_G, and the voltage level of the second initialization signal Vi_Ano.

Figure 7:
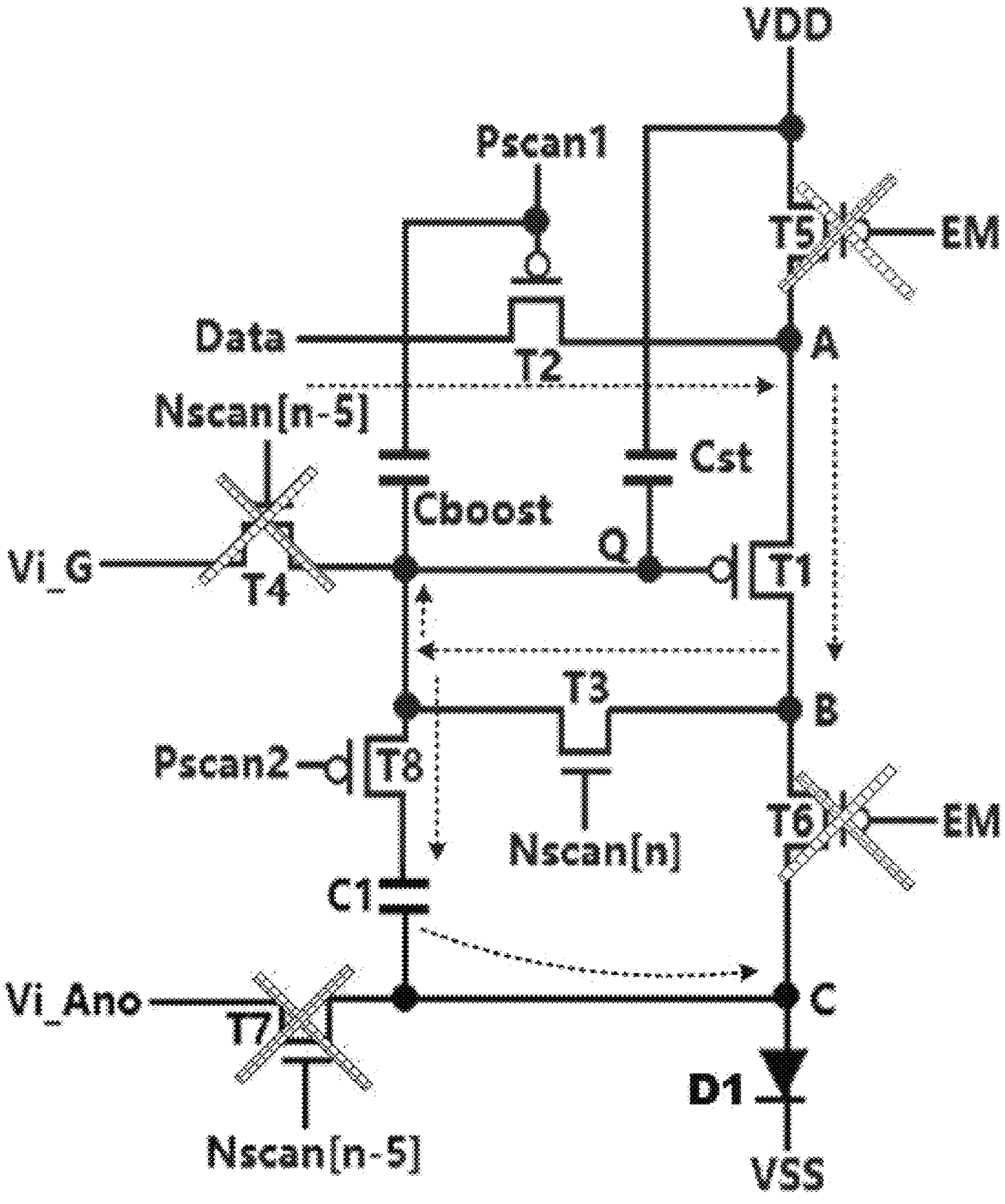
FIG. 7 is a diagram of the pixel circuit in a second stage of a frame according to an embodiment of the present disclosure.

The second stage S2 (data writing stage): as shown in FIGS. 5 and 7, the light-emitting control signal EM and the scan signal Nscan[n] are set high, the scan signal Pscan1, the scan signal Nscan[n−5] and the scan signal Pscan2 are set low, the first initialization transistor T4, the second initialization transistor T7, the first light-emitting control transistor T6 and the second light-emitting control transistor T5 are in the cut-off state, the compensation transistor T3 is in the turning-on state, and the writing transistor T2 and the feedback transistor T8 are turned on synchronously in at least part of the second stage S2.

It should be noted that, in this stage, the data signal Data is written to the gate of the driving transistor T1 by the writing transistor T2, the driving transistor T1 and the compensation transistor T3 in turn. The voltage level of the anode of the light-emitting device D1 is raised by the series-connected feedback transistor T8 and the feedback capacitor C1. At this time, the voltage level of the anode of the light-emitting device D1 is lower than or equal to the activation voltage of the light-emitting device D1.

It can be understood that when the voltage level of the anode of the light-emitting device D1 is equal to the activation voltage of the light-emitting device D1, there is no light emitting because the first light-emitting control transistor T6 or the second light-emitting control transistor T5 is in the cut-off state. In this stage, the voltage level of the gate of the driving transistor T1 rises from ViG to K*(VData+Vth), and correspondingly, the voltage level of the anode of the light-emitting device D1 rises from ViAno to K*(VData+Vth)−ViG+ViAno.

Here, ViG is the voltage level of the first initialization signal Vi_G. VData is the voltage level of the data signal Data. Vth is the threshold voltage of the driving transistor T1. K is related to the pixel circuit and is a constant. ViAno is the voltage level of the second initialization signal Vi_Ano.

The third stage S3 (light-emitting stage): As shown in FIGS. 5 and 8, the scan signal Pscan1 and the scan signal Pscan2 are set high; the light-emitting control signal EM, the scan signal Nscan[n] and the scan signal Nscan[n−5] are set low; the first initialization transistor T4, the second initialization transistor T7, the compensation transistor T3, the writing transistor T2 and the feedback transistor T8 are in the cut-off state; the driving transistor T1, the first light-emitting control transistor T6 and the second light-emitting control transistor T5 are turned on; and the light-emitting device D1 begins to emit light.

Figure 9:
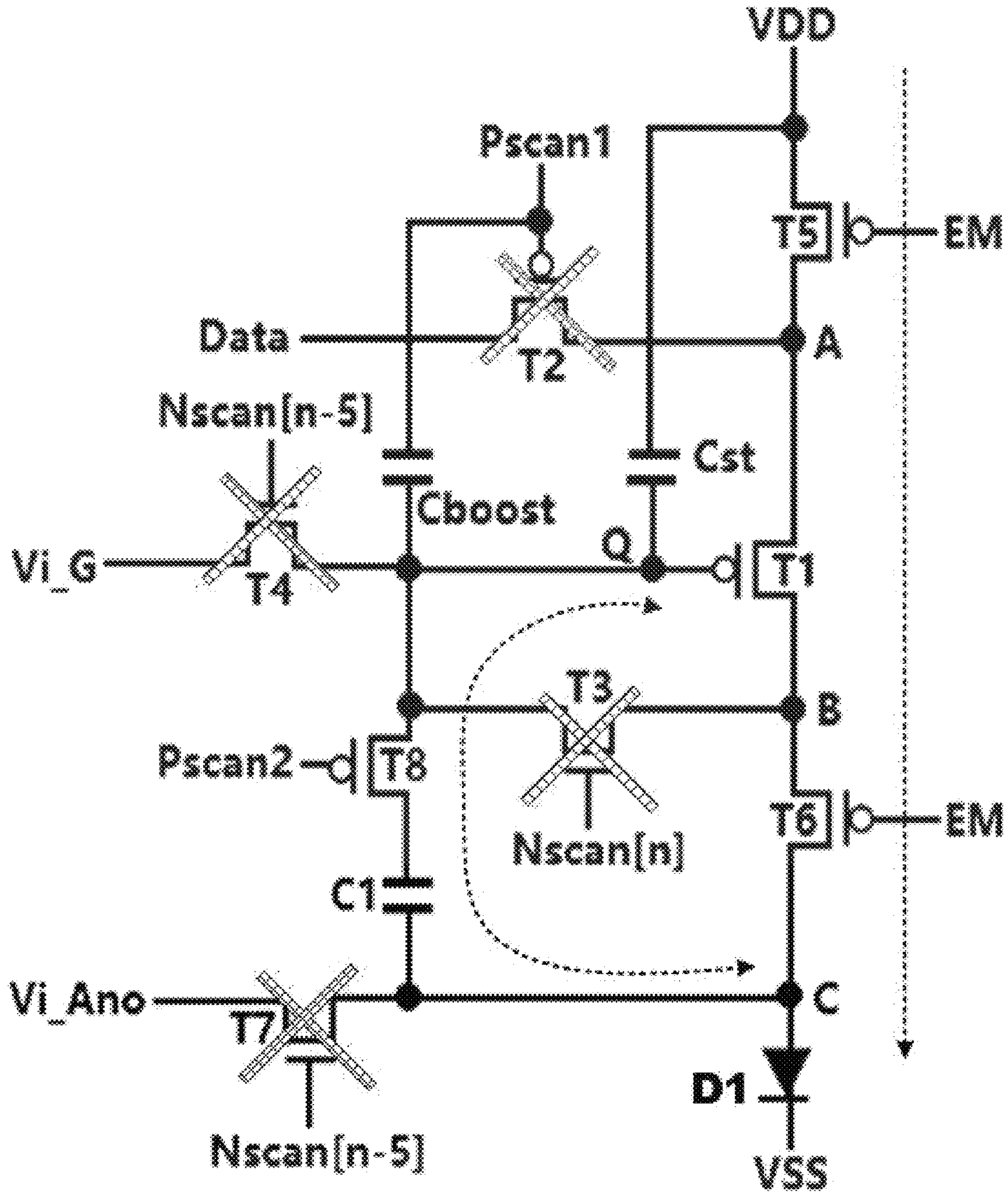
FIG. 9 is a diagram of the pixel circuit in a sub-third stage of the third stage of a frame according to an embodiment of the present disclosure.
Figure 10:
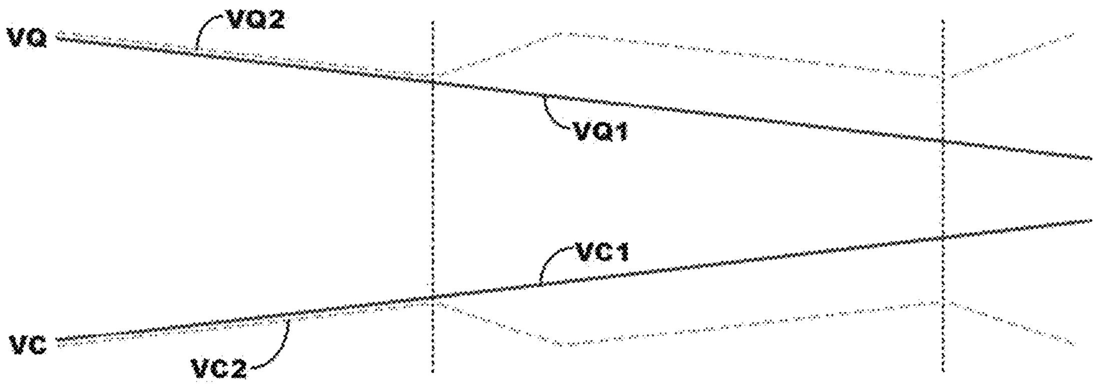
FIG. 10 is a diagram showing of the correlative change of voltage levels between the node Q and node C in the third sub-stage shown in FIG. 9.

The third sub-stage S3+: as shown in FIGS. 5, 9 and 10, the scan signal Pscan1 is set high; the scan signal Pscan2, the light emitting control signal EM, the scan signal Nscan[n] and the scan signal Nscan[n−5] are set low; the first initialization transistor T4, the second initialization transistor T7, the compensation transistor T3 and the writing transistor T2 are in the cut-off state; the feedback transistor T8, the driving transistor T1, the first light-emitting control transistor T6 and the second light-emitting control transistor T5 are turned on.

Because the compensation transistor T3 has the leakage current, the voltage level of the gate of the driving transistor T1 (the node Q) slightly decreases and the voltage level of the anode of the light-emitting device D1 (the node C) rises. In this way, the current flowing through the light-emitting device D1 increases and thus the brightness of the light-emitting device D1 increase. When the frequency of the first control signal is greater than the frequency of the light-emitting control signal EM, (that is, the frequency of the scan signal Pscan2 is higher than the frequency of the light-emitting control signal EM), the rise of the voltage level of the node C can be fed back to the node Q through the series-connected feedback transistor T8 and the feedback capacitor C1 to compensate for the influence of the leakage current on the node Q. Accordingly, the brightness of the light-emitting device D1 decreases, so that the brightness of the light-emitting device D1 can be maintained. In other words, the voltage level of the gate of the driving transistor T1 changes in reverse to the change of the voltage level of the anode of the light-emitting device D1 through the series-connected the feedback transistor T8 and feedback capacitor C1. This will be illustrated as follows in coordination with FIG. 10:

Here, VQ represents the voltage level at the node Q; and VC represents the voltage level at the node C. VQ1 represents the voltage level change curve of the node Q in the third sub-stage S3+ when the frequency of the scan signal Pscan2 is equal to the frequency of the light-emitting control signal EM. VC1 represents the voltage level change curve at the node C in the third sub-stage S3+ when the frequency of the scan signal Pscan2 is equal to the frequency of the light-emitting control signal EM. VQ2 represents the voltage level change curve of the node Q in the third sub-stage S3+ when the frequency of the scan signal Pscan2 is greater than the frequency of the light-emitting control signal EM. VC2 represents the voltage level change curve at the node C in the third sub-stage S3+ when the frequency of the scan signal Pscan2 is greater than the frequency of the light-emitting control signal EM.

After analysis, it is found that when the frequency of the scan signal Pscan2 is equal to the frequency of the light-emitting control signal EM, VQ1 continues to decrease and VC1 continues to rise. This makes the light-emitting current flowing through the light-emitting device D1 continue to increase or decrease, resulting in unstable brightness of the light-emitting device D1.

In the case that the frequency of the scan signal Pscan2 is greater than the frequency of the light-emitting control signal EM, or, in the case of configuring the scan signal Pscan2 in the light-emitting stage with at least one negative pulse, the change terminal of VQ2 and VC2 changes every time when the feedback transistor T8 is turned on, such that one of VQ2 and VC2 is increasing and the other one of VQ2 and VC2 is decreasing. This stably controls the light-emitting current flowing through the driving transistor T1.

Figure 11:
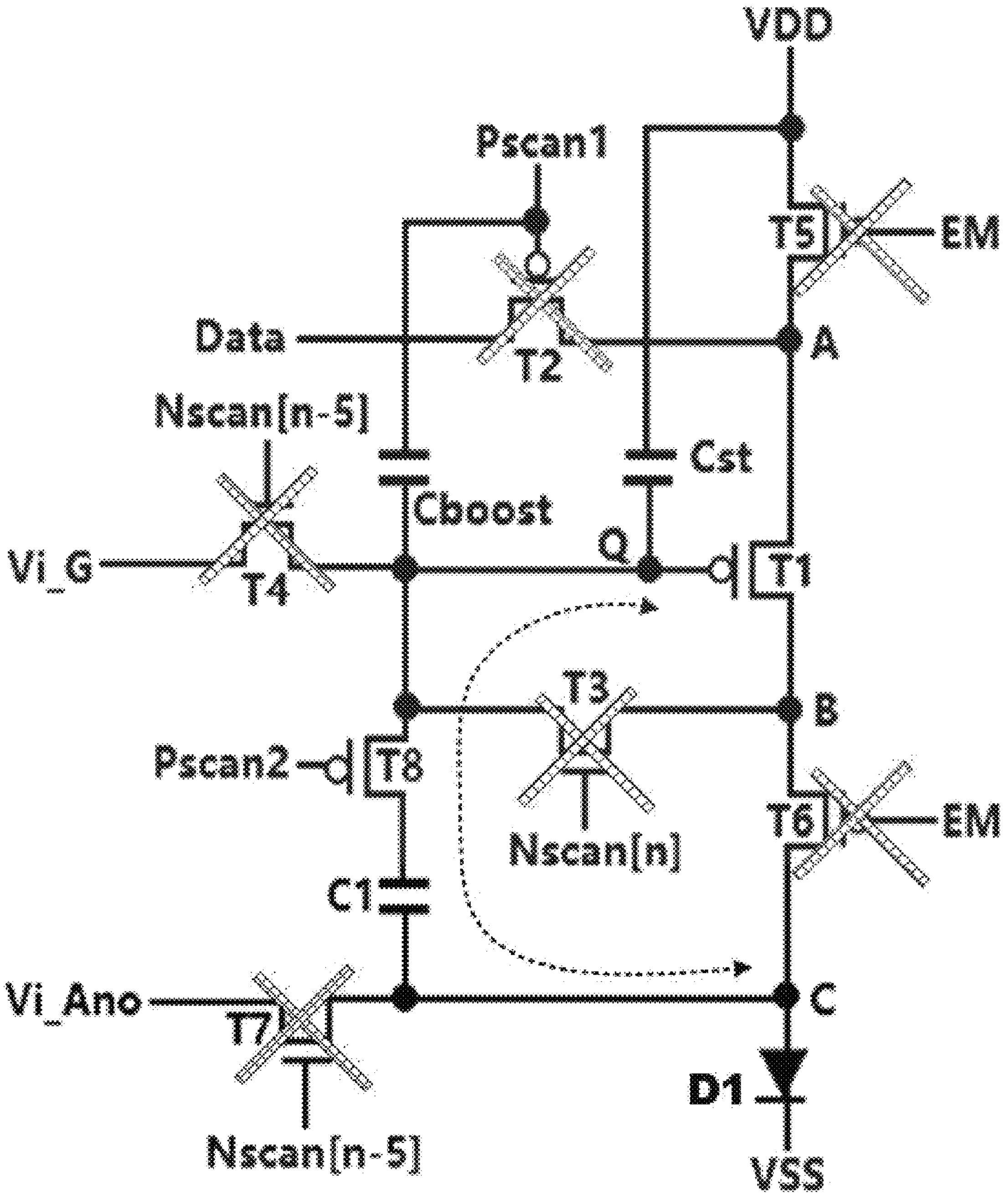
FIG. 11 is a diagram of the pixel circuit in a fourth stage of a frame according to an embodiment of the present disclosure.

The fourth stage S4 (black insertion stage): as shown in FIGS. 5 and 11, the light-emitting control signal EM and the scan signal Pscan1 are set high; the scan signal Pscan2, the scan signal Nscan[n] and the scan signal Nscan[n−5] are set low; the first initialization transistor T4, the second initialization transistor T7, the compensation transistor T3, the writing transistor T2, the first light-emitting control transistor T6 and the second light-emitting control transistor T5 are in the cut-off state; and the feedback transistor T8 and the driver transistor T1 are turned on.

It is noted that the feedback transistor T8 is turned on, and the voltage level of the node C is coupled to the node Q through the feedback capacitor C1 such that the voltage level of the node Q increases. This increased voltage level has a reverse impact on the node C and reduces the voltage level of the node C and thus the current flowing through the light-emitting device D1 decreases. This can offset the influence of the leakage current of the compensation transistor T3. In other words, in this stage, the voltage level of the gate of the driving transistor T1 can be raised by the series-connected feedback transistor T8 and the feedback capacitor C1, and the voltage level of the anode of the light-emitting device D1 can be reduced.

Because the frame time under the high-frequency driving (high refresh rate) is shorter than the frame time under the low-frequency driving (low refresh rate), the number of pulses of the scan signal Pscan1 in the frame time of the high-frequency drive is less than the number of pulses of the scan signal Pscan1 in the frame time of the low-frequency driving. This causes the data signal Data that does not reach the gate of the transistor T1 under the low-frequency driving to affect the voltage levels of the source and drain of the driving transistor T1. Therefore, through the feedback transistor T8 and the feedback capacitor C1, the voltage level of the gate of the driving transistor T1 and the voltage level of the anode of the light-emitting device D1 under the low-frequency driving can be fed back to each other. In this way, the brightness of the light-emitting device D1 can be stabilized.

In another embodiment, according to an embodiment of the present disclosure, a display panel is disclosed. The display panel comprises a plurality of aforementioned pixel circuits.

It is notes that, according to an embodiment, the display panel can control the voltage level of the gate of the driving transistor T1 to change correlatively to the voltage level of the anode of the light-emitting device D1 by coupling the feedback transistor T8 and the feedback capacitor C1 between the gate of the driving transistor T1 and the anode of the light-emitting device D1. This not only can control the current flowing through the light-emitting device D1 more stably through the voltage level of the gate of the driving transistor T1 and the voltage level of the anode of the light-emitting device D1 but also control the voltage level of the anode of light-emitting device D1 to reach the brightness voltage earlier. In this way, it can increasing the effective light-emitting time or improve the brightness of light-emitting device D1.

Because the currents flowing through the light-emitting devices D1 in different pixel circuits are more unified, the brightness of different light-emitting devices D1 is more uniform. Accordingly, the color shift of the display panel, such as the greenish display, is improved.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A pixel circuit, comprising:

a driving transistor, having a first electrode electrically connected to a first power line;

a light-emitting device, having an anode electrically connected to a second electrode of the driving transistor, and a cathode electrically connected to a second power line;

a feedback transistor, having a gate electrically connected to a first control line; and a feedback capacitor;

wherein the feedback capacitor and the feedback transistor are connected in series between the gate of the driving transistor and the anode of the light-emitting device;

wherein one terminal of the feedback capacitor is electrically connected to a first initialization line, and the first initialization line receives a first initialization signal; another terminal of the feedback capacitor is electrically connected to a second initialization line, and the second initialization line receives a second initialization signal; the feedback transistor is connected in series between the feedback capacitor and the first initialization line or the second initialization line; and a voltage level of the first initialization signal is different from a voltage level of the second initialization signal.

2. The pixel circuit of claim 1, further comprising:

a first initialization transistor, connected in series between the feedback capacitor and the first initialization line, and a gate of the first initialization transistor is electrically connected to a second control line;

a second initialization transistor, connected in series between the feedback capacitor and the second initialization line, and a gate of the second initialization transistor is electrically connected to the second control line.

3. The pixel circuit of claim 2, further comprising:

a first light-emitting control transistor, having a first electrode electrically connected to a second electrode of the driving transistor, a second electrode electrically connected to the anode of the light-emitting device, and a gate electrically connected to a light-emitting control line;

a second light-emitting control transistor, having a first electrode electrically connected to a first power line, a second electrode electrically connected to the first electrode of the driving transistor, and a gate electrically connected to the light-emitting control line;

a writing transistor, having a first electrode electrically connected to the data line, a second electrode electrically connected to the first electrode of the driving transistor, and a gate electrically connected to a third control line; and a compensation transistor, having a first electrode electrically connected to the second electrode of the driving transistor, the second electrode electrically connected to a gate of the driving transistor, and a gate is electrically connected to a fourth control line.

4. The pixel circuit of claim 2, wherein in an initialization stage of the pixel circuit, the first initialization transistor and the second initialization transistor are turned on, and the feedback transistor is turned on in at least part of the initialization stage to reset a voltage level of the gate of the driving transistor and a voltage level of the one terminal of the feedback capacitor through the first initialization signal and to reset a voltage level of the anode of the light-emitting device and a voltage level of the another terminal of the feedback transistor through the second initialization signal.

5. The pixel circuit of claim 1, wherein in a data writing stage of the pixel circuit, the data signal passes through the feedback transistor; the feedback capacitor raises a voltage level of the anode of the light-emitting device; and the voltage level of the anode of the light-emitting device is lower than an activation voltage of the light-emitting device.

6. The pixel circuit of claim 1, wherein in a light-emitting stage of the pixel circuit, a voltage level of a gate of the driving transistor changes inversely to a voltage level of the anode of the light-emitting device through the series-connected feedback transistor and the feedback capacitor.

7. The pixel circuit of claim 1, wherein in a black insertion stage of the pixel circuit, the series-connected feedback transistor and the feedback capacitor raise a voltage level of a gate of the driving transistor and reduce a voltage level of the anode of the light-emitting device.

8. The pixel circuit of claim 3, wherein the first control line is configured to transmit a first control signal, and the light-emitting control line is configured to transmit a light-emitting control signal; a frequency of the first control signal is greater than a frequency of the light-emitting control signal.

9. A display panel, comprising:

a pixel circuit, comprising:

a driving transistor, wherein one of a source and a drain of the driving transistor is electrically connected to a first power line;

a light-emitting device, having an anode electrically connected to the other of the source and the drain of the driving transistor, and a cathode electrically connected to a second power line;

a feedback transistor, having a gate electrically connected to a first control line; and a feedback capacitor;

a storage capacitor, coupled between a gate of the driving transistor and the first power line;

wherein the feedback capacitor and the feedback transistor are connected in series between the gate of the driving transistor and the anode of the light-emitting device;

wherein one terminal of the feedback capacitor is electrically connected to a first initialization line, and the first initialization line receives a first initialization signal; another terminal of the feedback capacitor is electrically connected to a second initialization line, and the second initialization line receives a second initialization signal; the feedback transistor is connected in series between the feedback capacitor and the first initialization line or the second initialization line; and a voltage level of the first initialization signal is different from a voltage level of the second initialization signal.

10. The display panel of claim 9, wherein the pixel circuit further comprises:

a first initialization transistor, connected in series between the one terminal of the feedback capacitor and the first initialization line, and a gate of the first initialization transistor is electrically connected to a second control line;

a second initialization transistor, connected in series between the another terminal of the feedback capacitor and the second initialization line, and a gate of the second initialization transistor is electrically connected to the second control line.

11. The display panel of claim 10, wherein in an initialization stage of the pixel circuit, the first initialization transistor and the second initialization transistor are turned on, and the feedback transistor is turned on in at least part of the initialization stage to reset a voltage level of the gate of the driving transistor and a voltage level of the one terminal of the feedback capacitor through the first initialization signal and to reset a voltage level of the anode of the light-emitting device and a voltage level of the another terminal of the feedback transistor through the second initialization signal.

12. The display panel of claim 10, wherein the pixel circuit further comprises:

a first light-emitting control transistor, wherein one of a source and a drain of the first light-emitting control transistor is electrically connected to the other of the source and the drain of the driving transistor, the other of the source and the drain of the first light-emitting control transistor is electrically connected to the anode of the light-emitting device, and a gate of the first light-emitting control transistor is electrically connected to a light-emitting control line;

a second light-emitting control transistor, wherein one of a source and a drain of the second light-emitting control transistor is electrically connected to a first power line, a second electrode of the second light-emitting control transistor is electrically connected to one of the source and the drain of the driving transistor, and a gate of the second light-emitting control transistor is electrically connected to the light-emitting control line;

a writing transistor, wherein one of a source and a drain of the writing transistor is electrically connected to the data line, the other of the source and the drain of the writing transistor is electrically connected to the first electrode of the driving transistor, and a gate of the writing transistor is electrically connected to a third control line; and a compensation transistor, wherein one of a source and a drain of the compensation transistor is electrically connected to the other of the source and the drain of the driving transistor, the other of the source and the drain of the compensation transistor is electrically connected to the gate of the driving transistor, and a gate of the compensation transistor is electrically connected to a fourth control line.

13. The display panel of claim 12, wherein the first control line is configured to transmit a first control signal, and the light-emitting control line is configured to transmit a light-emitting control signal; a frequency of the first control signal is greater than a frequency of the light-emitting control signal.

14. The display panel of claim 12, wherein the pixel circuit further comprises a bootstrap capacitor between the gate of the writing transistor and the gate of the driving transistor.

15. The display panel of claim 12, wherein a first initialization transistor and the compensation transistor are N-type thin-film transistors.

16. The display panel of claim 9, wherein in a data writing stage of the pixel circuit, the data signal passes through the feedback transistor; the feedback capacitor raises a voltage level of the anode of the light-emitting device; and the voltage level of the anode of the light-emitting device is lower than an activation voltage of the light-emitting device.

17. The display panel of claim 9, wherein in a light-emitting stage of the pixel circuit, a voltage level of a gate of the driving transistor changes inversely to a voltage level of the anode of the light-emitting device through the series-connected feedback transistor and the feedback capacitor.

18. The display panel of claim 9, wherein in a black insertion stage of the pixel circuit, the series-connected feedback transistor and the feedback capacitor raise a voltage level of a gate of the driving transistor and reduce a voltage level of the anode of the light-emitting device.

* * * * *